United States Patent [19]
Stoller

[11] 3,828,470

[45] Aug. 13, 1974

[54] MUSHROOM SPAWN AND METHOD OF MAKING SAME

[75] Inventor: Benjamin B. Stoller, Santa Cruz, Calif.

[73] Assignee: Stoller Research Co., Santa Cruz, Calif.

[22] Filed: June 14, 1971

[21] Appl. No.: 153,032

Related U.S. Application Data

[63] Continuation-in-part of Ser. No. 79,265, Oct. 8, 1970, abandoned.

[52] U.S. Cl. .......................................... 47/1.4, 71/5
[51] Int. Cl. .............................................. C05g 1/00
[58] Field of Search ...................... 71/5; 47/1.4, 1.2

[56] References Cited
UNITED STATES PATENTS

| | | | |
|---|---|---|---|
| 2,044,861 | 6/1936 | Sinden | 47/1.1 |
| 2,189,303 | 2/1940 | Stoller | 47/1.1 X |
| 2,260,201 | 10/1941 | Stoller | 47/1.1 |
| 2,520,318 | 8/1950 | Lescaboura | 47/1.1 |
| 2,677,917 | 5/1954 | Speakman | 47/1.1 |
| 3,177,615 | 4/1965 | Rowe | 47/1.1 |

*Primary Examiner*—Robert E. Bagwill
*Attorney, Agent, or Firm*—Limbach, Limbach & Sutton

[57] ABSTRACT

Mushroom spawn and the method of making same wherein the substrate is prepared with finely ground feedstuffs. Flocculating agents and trituration permit the finely granular mixture to serve as a substrate without becoming a sticky paste or cement-like product. The finely ground substrate provides for increased and faster mycelial growth throughout the compost, and for greater mushroom yield from the use of a particular amount of spawn.

11 Claims, No Drawings

MUSHROOM SPAWN AND METHOD OF MAKING SAME

This is a continuation in part of copending application Ser. No. 79,265, filed Oct. 8, 1970, and now abandoned.

BACKGROUND OF THE INVENTION

This invention relates to a medium and substrate or "spawn" for growing microbes, fungi, or mycelium and to the process of preparing the spawn. More particularly, the spawn of the present invention is prepared with a meal or powder or finely ground grain, seeds or feedstuffs in place of whole grain or manure as a substrate.

Early methods of mushroom spawn making used a compost of horse manure or a mixture of this and cow manure as a substrate. A significant improvement in spawn making was introduced by U.S. Pat. No. 1,869,517 to James W. Sinden. In the Sinden method cereals or cereal products such as hominy, cracked wheat, whole grain wheat, barley, rye, oats, rice, etc., were substituted for manure compost as the spawn substrate. While the Sinden method was an important improvement, nevertheless, the nature of the spawn growth process is such that a substrate consisting of particles smaller than Sinden's whole grain is desirable.

Heretofore, however, no attempt has been reported in the literature to grind grain and feedstuffs into a meal or powder for use as a substrate for mycelial growth, or spawn making. In fact, in preparing whole grain spawn, cracked grains are usually considered undesirable on account of the starchy surface exposed by this cracking. Starchy surfaces ordinarily lead to "sectoring" or tissuing of the mycelium. The other difficulty in preparing spawn from a meal or powder is that such a powder tends to become an unusable, sticky paste.

SUMMARY OF THE INVENTION

In accordance with the teachings of the present invention, the difficulty of making the meal or powder in place of whole grain as a substrate for spawn is surmounted by flocculating the meal with gypsum and other flocculating agents and by triturating the material with the proper moisture by passage through a grinder, hammer mill, or sifter.

With the increasingly current practice of "thorough-spawning," that is, the process wherein the spawn is mixed throughout the compost instead of only near the surface of the compost, a finely granular or powdery spawn is preferable to the large, whole grain particles of so-called "grain spawn." The fine, granular particles of the granular or powdery spawn of this invention will more intimately and extensively mix with the compost in the mushroom bed or tray, and cause a faster growth through the compost than an equal weight of the whole, large grain particles of "grain spawn." A faster growth of spawn in the compost will prevent competitive molds or fungi from growing in the same compost and so reducing yields. Also, a faster growth throughout the compost will allow earlier production of mushrooms and a better return on investments. Furthermore, a substrate consisting of finely ground-up grains and feedstuffs, permits the mycelium to grow completely and rapidly throughout the substrate instead of largely on the surface of the whole grain particles as with whole "grain spawn." Also, by this fine subdivision of the grains and feedstuffs, unlimited possibilities are provided for formulation of substrates as illustrated in the examples disclosed herein. While the mushroom mycelium will not grow on feedstuffs such as cottonseed meal, soybean meal, etc., when used alone as an autoclaved substrate, the mycelium will grow on these materials when formulated as in the examples presented herein. Accordingly, this kind of formulation in which many permutations of ingredients may be combined according to the teachings of the invention allows for additive, adjuvant and cumulative effects for better growth of spawn and production of mushrooms, which is not possible when singular, whole grains are employed as substrates. This process permits the preparation of formulas for specific kinds of composts and for specific conditions of disease and pest control. This method of formulating provides not only a source of inoculum of the mycelium, but also includes effective supplementation of nutrients for increased mushroom production, disease resistance and pest control.

Spawn is prepared according to the present invention by first forming a mixture including finely ground feedstuff flocculating agent, pH controlling agent, cellulose material, toxin absorbent agent, and water. The amounts of the various components of the mixture must be controlled to prevent the production of a pasty or cement-like product. The mixture is cooked to obtain uniform moisture throughout the mass of material, and the cooked material is subjected to trituration and attrition by passage through a hammer mill. Finely separated granular particles thus produced are filled into bottles and sterilized or autoclaved as is the usual practice in spawn making. The sterilized substrate is then inoculated with mycelium and after the mycelium has grown over the substrate to produce the "spawn" it is passed through a second hammer mill or sifter to break up any lumpiness occurring during growth. Wetting agents such as Triton X100 or Tween 80 appear to have a useful effect on growth of mycelium. The spawn is then ready for packaging for sale to mushroom growers.

DESCRIPTION OF THE PREFERRED EMBODIMENTS

The substrate according to this invention is prepared with a meal or powder made by finely grinding grain, seeds or feedstuffs. Suitable materials include cereal or cereal products including milo grain (a variety of sorgum grain), wheat bran, ground corn, safflower seed meal, rice bran, corn grain, oat grain, barley grain, cottonseed meal, soybean meal, casein, yeast, etc.

A flocculating agent is added to the meal: the flocculating agents used are inorganic ones such as finely ground or powdered gypsum, superphosphate (a mixture of gypsum and calcium phosphate), calcium chloride, iron, aluminum and manganese sulfates and magnesium sulfate, shale, diatomaceous earth, perlite, sand, silt, by-products of cement manufacture, inorganic dusts collected in precipitators, "dust collectors" or driers, and "drier dust" (a mixture of shale and limestone). Various organic flocculating agents or aggregating coagulants as used in sewerage disposal, like "SEPARAN" may also be used. SEPARAN is chemically Polyacrylamide, which is a high molecular weight synthetic polymer formed from polymerization of acrylamide. Wetting agents, of which TRITON x-100 or TWEEN 80 are only two examples, appear to have a useful effect on growth of mycelium. TRITON x-100 is chemically Octyl phenoxy polyethoxy ethanol. TWEEN 80 is chemically Polyoxyethylene sorbitan monoleate. Gypsum and/or shale are preferred and may be used alone or in combination with other flocculating and wetting agents. The amount of agent used is regulated by the effect on growth of the mycelium. When the rate of growth of the mycelium is reduced by increasing quantities of the agent, then that amount is considered excessive. Besides serving as a flocculating agent, gypsum or shale also function as carriers of the fine particles of feedstuffs or meal, and thus greatly extending the points or centers of spawn inoculation. Accordingly, the non-toxic gypsum or shale are also used to produce a proper dilution of the finely-ground meal or feedstuff.

The suitability of the substrate prepared according to this process is further enhanced by the admixture of a finely to coarsely ground cellulose material like rice hulls or cotton seed hulls. The high silica content and/or the water repellent properties of the hulls prevent acclusion and coalescence of the particles in the meals, so that the mass of ingredients does not become a pasty mass when mixed with water and cooked. Other materials that may be used in place of rice hulls are finely to coarsely ground cereal straws, sugar bagasse, coffee grinds, cocoa shells, and finely ground cellulose of sawdust of various kinds. By the designations, "finely to coarsely ground" is meant that the bulk of the material, (over 50 percent), can pass through a screen or sieve with perforations of 10 to 200 mesh, and preferably 50 to 100 mesh.

The growth of the spawn made with substrates as described previously is further enhanced by the addition of powdered calcium carbonate and very finely ground, activated carbon. The calcium carbonate regulates the pH of the substrate between pH 5.5 to 7.5, preferably pH 6.5. The activated carbons absorb and remove by adhesion, toxic substances that occur.

All the ingredients used in a specific formula are finely ground by a hammer mill or grinder. Or the ingredients may be formulated as a solution or suspension in place of the water specified in the formula. All the ingredients, including the water, are mixed together in a suitable mixer. The moisture content of a particular formulation depends upon the kind of ingredients, the source or derivation of a material, and the moisture content naturally present in the ingredient. A practical test for deciding the amount of water that is adequate for a specific formulation is the hand compression test, as follows: After an apparent sufficiency of water is added, a handful of the mixture is compressed. If upon opening the hand, the material readily falls apart, indicating the mixture is in a friable condition, then the moisture is considered adequate. On the other hand, if the compressed material becomes a pasty mass like "putty," then the amount of water added is considered excessive. The amount of water to be added is governed by a moisture content just short of this "putty-like" condition. The flocculating agents and the cellulosic materials, like finely ground rice hulls, tend to prevent the mass from becoming pasty.

After all the ingredients, including the water, are mixed to a homogeneous mass, the material is cooked at 250°F. for approximately one half hour. This pre-cooking of ingredients is not essential, but is preferable in order to obtain a more uniform moisture and to warm the material before filling in glass bottles, so as to prevent breakage while autoclaving. If the water is added in a very fine spray and a suitable mixer, uniform moisture content of ingredients can be obtained without pre-cooking. The material is then passed through a hammer mill, grinder or sifter with fixed or swinging hammers or revolving paddles and with a screen or sieve with a porosity of one-fourth inch to three-fourth inch. The size of the openings or perforations of the screen or perforated rigid plate is determined as the smallest size at which these perforations are not clogged when the machine is in continuous use. The screen or perforated rigid plate are not required if the high speed of the rotating hammers, paddles or machine drum itself (when hammers or paddles are fixed) are adequate to separate the fine particles of the ingredients. When the rapidly revolving hammers (about 3,400 revolutions per minute) force the cooked material through the screen, the material is finely granular, and is then filled into bottles. If the size of the bottles is one half gallon, then the bottles are sterilized at 250°F. or 15 lbs. steam pressure for 2 or 3 hours cooled and inoculated with mushroom mycelium. After the growth of the mycelium on the substrate in the bottle, which is designated as the "spawn" then the said spawn is removed from the bottle. The spawn, which may be lumpy due to the interweaving caused by the growth of the mycelial strands, is poured from the bottle into a grinding machine or sifter machine. The spawn then passes through a screen or a perforated rigid plate attached to these machines, and by means of hammers or paddles, the spawn is forced through openings of the screen or plate, so that the spawn emerges as a fine granular or powdery material. The types of machines for this operation, as well as after the initial mixing, are highly variable. The hammers or paddles may also be fixed and the screen revolve. Or there may be partially fixed hammers or plates between which other hammers revolve. The finely granular or powdery spawn is then ready for use by the grower. However, the spawn prepared as described above is highly perishable and must be shipped or stored under refrigeration. To avoid this need for refrigeration, the spawn may be vacuum-dried in a suitable vacuum drier at temperatures which will not injure the spawn (usually less than 80°F.). Upon drying, the spawn may become lumpy again, so it may be necessary to grind or sift it again as described above. The dried spawn may then be packaged in suitable containers, and shipped and stored without special refrigeration until used. The drying of the spawn may be facilitated by the addition of silica gel, silica, finely prepared diatomaceous earth like "Micro-cel" and similar "anti-caking" and drying agents. Also, small quantities of these drying or "anti-caking" agents may be added to facilitate making the spawn in a "powder" form. These drying and anti-caking agents may be added to the substrate before or after inoculation with mycelium or micro-organisms. For the purpose of preparing a dried spawn, the addition of the agents are preferable upon completion of growth on the substrate. It should be understood that the substrate may be inoculated with other microbes or fungi and is not limited to mycelium.

The invention will be more fully understood by reference to the following specific examples of substrates. It is understood that the examples are presented for purposes of illustration only and are not intended as a limitation of the invention. All of the examples below have been tested for mushroom production and the yields of mushrooms from beds spawned with these formulas have been as good or better, and usually much better than the yields from beds spawned with whole grain spawn.

EXAMPLE 1

| | |
|---|---|
| Finely ground milograin | 10 lbs. |
| Gypsum | 10 lbs. |
| Precipitated calcium carbonate | ½ lb. |
| Activated carbon powder | 1/10 lb. |
| Water | 7½ lbs. |

EXAMPLE 2

| | |
|---|---|
| Finely ground milo grain | 5 lbs. |
| Finely ground corn | 5 lbs. |
| Gypsum | 10 lbs. |
| Precipitated calcium carbonate | ½ lb. |
| Activated carbon powder | 1/10 lb. |
| Water | 7½ lbs. |

EXAMPLE 3

| | |
|---|---|
| Finely ground milo grain | 3.5 lbs. |
| Finely ground corn grain | 3.5 lbs. |
| Finely ground barley grain | 3.5 lbs. |
| Gypsum | 10.0 lbs. |
| Water | 7½ lbs. |
| Precipitated calcium carbonate | ½ lb. |
| Activated Carbon powder | 1/10 lb. |

EXAMPLE 4

| | |
|---|---|
| Finely ground Oat grain | 5 lbs. |
| Finely ground Wheat grain | 2 lbs. |
| Finely ground Corn grain | 3 lbs. |
| Gypsum | 10 lbs. |
| Water | 7½ lbs. |
| Precipitated calcium carbonate | ½ lb. |
| Activated carbon powder | 1/10 lb. |

EXAMPLE 5

| | |
|---|---|
| Finely ground milo grain | 5 lbs. |
| Finely ground corn grain | 5 lbs. |
| Gypsum | 10 lbs. |
| Water | 7½ lbs. |
| Precipitated calcium carbonate | 1 lb. |
| Ferrous Sulfate | ¼ lb. |
| Aluminum Sulfate | ¼ lb. |

EXAMPLE 6

| | |
|---|---|
| Finely ground milo grain | 3 lbs. |
| Finely ground corn grain | 3 lbs. |
| Finely ground barley grain | 2 lbs. |
| Finely ground cocoa shells | 1 lb. |
| Coarsely ground alfalfa | 1 lb. |
| Precipitated calcium carbonate | ½ lb. |
| Activated carbon powder | 1/10 lb. |
| Water | 7½ lbs. |

EXAMPLE 7

| | |
|---|---|
| Finely ground milo grain | 3.5 lbs. |
| Finely groumd corn grain | 3.5 lbs. |
| Finely ground barley grain | 3.0 lbs. |

EXAMPLE 7-Continued

| | |
|---|---|
| Finely ground rice hulls | 1.0 lb. |
| Gypsum | 10.0 lbs. |
| Water | 8.0 lbs. |
| Precipitated calcium carbonate | ½ lb. |
| Activated carbon powder | 1/10 lb. |

EXAMPLE 8

| | |
|---|---|
| Finely ground wheat bran | 4 lbs. |
| Finely ground milo grain | 3 lbs. |
| Finely ground corn grain | 3 lbs. |
| Gypsum | 10 lbs. |
| Water | 8 lbs. |
| Precipitated calcium carbonate | ½ lb. |
| Activated carbon powder | 1/10 lb. |

EXAMPLE 9

Same as Example No. 8 plus 1 lb. finely ground rice hulls and ½ lb. more water.

EXAMPLE 10

Same as Example No. 8 plus 2 lbs. finely ground rice hulls and 1 lb. more water.

EXAMPLE 11

| | |
|---|---|
| Finely ground milo grain | 5 lbs. |
| Finely ground corn grain | 2½ lbs. |
| Finely ground barley grain | 2½ lbs. |
| Finely ground rice hulls | 1 lb. |
| Gypsum | 10 lbs. |
| Water | 8 lbs. |
| Precipitated calcium carbonate | ½ lb. |
| Activated carbon powder | 1/10 lb. |

EXAMPLE 12

| | |
|---|---|
| Finely ground wheat bran | 2 lbs. |
| Finely ground rice bran | 2 lbs. |
| Finely ground milo grain | 3 lbs. |
| Finely ground corn grain | 3 lbs. |
| Gypsum | 10 lbs. |
| Limestone | 2 lbs. |
| Water | 8 lbs. |

EXAMPLE 13

| | |
|---|---|
| Finely ground milo grain | 10 lbs. |
| Finely ground corn grain | 8 lbs. |
| Finely ground barley grain | 5 lbs. |
| Finely ground safflower meal | 3 lbs. |
| Finely ground Cocoa shells | 1 lb. |
| Coarse ground alfalfa | 1 lb. |
| Precipitated calcium carbonate | 2 lbs. |
| Activated carbon powder | ⅓ lb. |
| Ferrous Sulfate* | ½ lb. |
| Aluminum Sulfate* | ½ lb. |
| Gypsum | 30 lbs. |
| Water | 22½ lbs. |

*Ferrous and aluminum sulfate powder dissolved in water prior to mixing with other ingredients.

EXAMPLE 14

| | |
|---|---|
| Yeast powder | 6 grams |
| Alphacel (cellulose) | 100 grams |

EXAMPLE 14-Continued

| | |
|---|---|
| Gypsum | 100 grams |
| Activated carbon powder | 2.5 grams |
| Water | 213 ml. |

EXAMPLE 15

Same as Example No. 14, except that 6 grams of ammonium caseinate is substituted for yeast.

EXAMPLE 16

Same as Example 14 except that 12 grams of soybean meal powder is substituted for the yeast.

EXAMPLE 17

Same as Example 14 except that 12 grams of cottonseed meal is substituted for the yeast.

EXAMPLE 18

| | |
|---|---|
| "Pharmamedia" (cotton seed meal) | 96 grams |
| Alphacel (cellulose) | 400 grams |
| Gypsum | 400 grams |
| Activated carbon powder | 10 grams |
| Water | 975 ml. |

EXAMPLE 19

Same as Formula 18, except that the "Pharmamedia" is reduced to 48 grams and in addition 24 grams of torula yeast powder is added.

EXAMPLE 20

| | |
|---|---|
| Casein powder | 48 grams |
| Alphacel | 400 grams |
| Gypsum | 400 grams |
| Activated carbon powder | 10 grams |
| Water | 950 ml. |

EXAMPLE 21

| | |
|---|---|
| Coarsely ground peat* | 200 grams |
| Finely ground wheat | 100 grams |
| Gypsum | 100 grams |
| Water | 100 ml. |

*Peat neutralized with limestone and saturated with water.

EXAMPLE 22

| | |
|---|---|
| Finely ground milo grain | 200.0 grams |
| Casein powder | 12.0 grams |
| Activated carbon powder | 2.5 grams |
| Precipitated calcium carbonate | 25.0 grams |
| Gypsum | 200.0 grams |
| Water | 150.0 ml. |

EXAMPLE 23

| | |
|---|---|
| Finely ground wheat grain | 100 grams |
| Alphacel | 100 grams |

EXAMPLE 23-Continued

| | |
|---|---|
| Gypsum | 200 grams |
| Precipitated calcium carbonate | 25 grams |
| Activated carbon powder | 2.5 grams |
| Water | 275 ml. |

EXAMPLE 24

| | |
|---|---|
| Finely ground millet meal | 200 grams |
| Gypsum | 200 grams |
| Calcium carbonate | 2.5 grams |
| Activated Carbon powder | 1.5 grams |
| Water | 135 ml. |

EXAMPLE 25

| | |
|---|---|
| Finely ground corn meal | 200 grams |
| Gypsum | 200 grams |
| Precipitated calcium carbonate | 5 grams |
| Activated carbon powder | 1.5 grams |
| Water | 150 ml. |

EXAMPLE 26

| | |
|---|---|
| Finely ground milo grain | 2.5 lbs. |
| Finely ground corn grain | 2.5 lbs. |
| Finely ground barley | 2.5 lbs. |
| Coarsely ground rice hulls | 2.5 lbs. |
| "Drier Dust" | 10.0 lbs. |
| ("Drier Dust" is a mixture of shale and limestone which is a by-product in the manufacture of cement.) | |
| Precipitated calcium carbonate | 0.5 lb. |
| Water | 8.5 lbs. |
| Finely ground activated carbon | 20.0 grams |

EXAMPLE 27

| | |
|---|---|
| Finely ground milo grain | 5.0 lbs. |
| Finely ground corn grain | 2.5 lbs. |
| Finely ground barley grain | 2.5 lbs. |
| Drier Dust | 12.0 lbs. |
| Precipitated calcium carbonate | 0.5 lb. |
| Water | 9.0 lbs. |
| Finely ground activated carbon | 20.0 grams |

EXAMPLE 28

| | |
|---|---|
| Finely ground milo grain | 4.0 lbs. |
| Finely ground corn grain | 2.5 lbs. |
| Finely ground barley grain | 2.5 lbs. |
| Finely ground rice bran | 0.5 lb. |
| Coarsely ground rice hulls | 0.5 lb. |
| Coarsely ground Monterey shale | 10.0 lbs. |
| Precipitated calcium carbonate | 1.0 lbs. |
| Water | 8.5 lbs. |
| Finely ground activated carbon | 20.0 grams |

EXAMPLE 29

| | |
|---|---|
| Finely ground milo grain | 4.0 lbs. |
| Finely ground corn grain | 2.5 lbs. |
| Finely ground barley grain | 2.5 lbs. |
| Finely ground rice bran | 0.5 lb. |
| Coarsely ground rice hulls | 0.5 lb. |
| Powdery yeast | 0.5 lb. |
| Drier Dust | 7.0 lbs. |
| Gypsum | 3.0 lbs. |
| Fine grains of sand | 2.0 lbs. |
| Water | 8.5 lbs. |
| Precipitated calcium carbonate | 0.7 lb. |
| Powdered activated carbon | 20.0 grams |

EXAMPLE 30

| | |
|---|---|
| Finely ground milo grain | 24 lbs. |
| Finely ground corn grain | 15 lbs. |
| Finely ground barley grain | 15 lbs. |
| Finely ground rice bran (50%) and rice hulls (50%) | 6 lbs. |
| Precipitated calcium carbonate | 3 lbs. |
| Powdered activated carbon | ¼ lb. |
| Water | 51 lbs. |

This composition was divided into 6 parts and to each of these parts was added the following materials:

| No. | | |
|---|---|---|
| 1 | Ground up (20 to 60 mesh) Shale (Monterey) | 12 lbs. |
| 1A | Ground up (20 to 60 mesh) Shale (Monterey) | 14 lbs. |

Note: No. 1A was prepared from a different batch of same composition.

| | | |
|---|---|---|
| 2 | Fine sand (60 mesh) | 12 lbs. |
| 3 | Coarse sand (20 to 60 mesh) | 12 lbs. |
| 4 | Drier Dust | 6 lbs. |
| | Fine sand | 6 lbs. |
| 5 | Gypsum (powder as usual) | 6 lbs. |
| | Fine sand | 6 lbs. |
| 6 | Drier Dust | 6 lbs. |
| | Gypsum | 3 lbs. |
| | Fine sand | 3 lbs. |

In a test with these six variations, the mushroom mycelium grew very rapidly on variation No. 1 and No. 1A. Growth on No. 6 was somewhat slower than No. 1. Growth on No. 4 and No. 5 was distinctly slower than No. 1 (bottle was 3/4 full compared to full for No. 1). Growth on No. 2 and No. 3 was considerably slower (bottle was one half full of mycelial growth compared to full for No. 1). Nevertheless the differences were equivalent to 2 to 3 days longer for completion of growth. Upon shaking and regrowing, the same differences prevailed. So that while a substrate made with fine or coarse sand is less desirable, a "spawn" can be made by the use of this material. Also the more costly shale or gypsum can be diluted with sand to produce a practical spawn or microbiological product.

Since many embodiments may be made of this invention and since many changes may be made in the embodiments described, the foregoing is to be interpreted as illustrative only and the invention is defined by the appended claims.

I claim:

1. An improved process for the production of spawn comprising:

A. mixing finely ground feedstuff, flocculating agent, pH control agent and water,
   B. treating the mixture to achieve uniform moisture content,
   C. triturating the mixture,
   D. sterilizing the triturated mixture, and
   E. inoculating the sterilized mixture with inoculum selected from the group consisting of microbes, fungi and mycelium.

2. The process of claim 1 further comprising the step of further triturating the mixture after it is overgrown.

3. The process of claim 2 further comprising the step of vacuum drying said further triturated mixture.

4. The process of claim 3 comprising the step of further triturating the mixture after it is vacuum dried.

5. The process of claim 2 wherein the mixture further comprises a cellulose material and antitoxicant agent.

6. The process of claim 5 wherein said antitoxicant agent is activated carbon.

7. The process of claim 1 wherein said flocculating agent comprises inorganic agents selected from the group consisting of powdered gypsum, superphosphate, calcium chloride, iron, aluminum and manganese sulfates, magnesium sulfate, shale, diatomaceous earth, perlite, sand, silt, by-products of cement manufacture, inorganic dusts collected in precipitators, dust collectors or driers, and drier dust.

8. The process of claim 1 wherein said flocculating agent comprises an organic material.

9. The process of claim 8 wherein said organic flocculating agent comprises an aggregating coagulant of the type used in sewerage disposal.

10. The process of claim 1 wherein said pH controlling agent comprises calcium carbonate.

11. The process of claim 1 wherein said flocculating agent is selected from the group consisting of gypsum and shale.

* * * * *